United States Patent [19]

Gradeff

[11] Patent Number: 4,881,976

[45] Date of Patent: Nov. 21, 1989

[54] ANTIFOULING PAINTS CONTAINING MATRICES CROSS-LINKED WITH LANTHANIDES AND METHODS OF MAKING AND USE

[75] Inventor: Peter S. Gradeff, Pottersville, N.J.

[73] Assignee: Rhone-Poulenc Inc., Princeton, N.J.

[21] Appl. No.: 259,284

[22] Filed: Oct. 18, 1988

Related U.S. Application Data

[63] Continuation-in-part of Ser. No. 121,646, Nov. 17, 1987, abandoned.

[51] Int. Cl.$^4$ ............................................... C09D 5/14
[52] U.S. Cl. ................................... 106/15.05; 106/16; 252/106
[58] Field of Search ................. 106/15.05, 16; 252/106

[56] References Cited

U.S. PATENT DOCUMENTS

| | | | |
|---|---|---|---|
| 2,565,175 | 8/1951 | Hager | 424/626 |
| 3,080,212 | 3/1963 | Oberley et al. | 427/440 |
| 4,143,010 | 3/1979 | Rak | 106/15.05 |
| 4,282,126 | 8/1981 | Rodgers et al. | 106/16 |
| 4,287,239 | 9/1981 | Hager | 427/397 |
| 4,303,705 | 12/1981 | Kelso, Jr. | 427/440 |
| 4,325,993 | 4/1982 | Schroder | 427/315 |
| 4,335,109 | 6/1982 | Hill | 106/15.05 |
| 4,466,998 | 8/1984 | McIntyre et al. | 427/297 |
| 4,532,161 | 7/1985 | Collins et al. | 427/440 |
| 4,567,115 | 1/1986 | Trumble | 428/541 |
| 4,675,051 | 6/1987 | Baxter | 106/16 |
| 4,743,473 | 5/1988 | Gradeff | 106/15.05 |

*Primary Examiner*—Paul Liberman
*Assistant Examiner*—Willie J. Thompson
*Attorney, Agent, or Firm*—Morgan & Finnegan

[57] ABSTRACT

Described is a composition of wood, or wood-derived matrix and one or more lanthanide elements of lanthanide element derivatives bonded to the matrix, a method of making the composition and a method of use. The composition is useful as an antifouling additive in paints.

20 Claims, No Drawings

ANTIFOULING PAINTS CONTAINING MATRICES CROSS-LINKED WITH LANTHANIDES AND METHODS OF MAKING AND USE

This application is a continuation-in-part of application Ser. No. 07/121,646, filed Nov. 17, 1987 now abandoned which is incorporated herein by reference.

BACKGROUND OF THE INVENTION

1. Field of the Invention

The present invention pertains to antifouling additives for paints containing matrices cross-linked with lanthanide elements or lanthanide element derivatives and their use. More particularly the present invention pertains to antifouling paints containing a wood matrix or wood-derived matrix and one or more members of the group consisting of lanthanide elements and lanthanide element derivatives.

2. Discussion of the Prior Art

Antifoulants are an important class of additives for paints that are primarily used on surfaces exposed to a marine environment. Marine organisms, such as barnacles, seaweed algae, bacteria, fungi and protozoa, tend to colonize those surfaces rapidly and to a great extent. When such colonization occurs on hulls of marine vessels, for instance, the effect on increased fuel cost is considerable. It is estimated that the increased fuel cost may be as much as 30% above fuel costs under normal conditions. Controlling or preventing the growth of marine organisms is therefore an important concern for mariners as well as marine paint manufactures.

Copper oxide is one of the most widely used antifouling agents. It is added in unusually large amounts and may constitute from 40 to 70% of the coating weight. In order to increase the fouling free life of the coating, the thickness of it is commonly doubled or tripled. Copper oxide is used in insoluble as well as soluble coating matrices. The mechanism of action is due to leaching triggered by interaction with the marine organisms upon contact, or a slow release mechanism associated with binding loss, e.g., reduced binding with rosin. The protection can last up to about a year. The leaching of the toxicant copper oxide in the environment has been a health concern.

Other antifoulants used alone or in combination with copper oxide are organo-tin compounds such as tributyl tin oxide, tributyl tin floride, triphenyl tin floride as well as organo-tin polymers such as acrylate. They also act on the principle of toxicant release. While the diffusional transport of copper oxide is exponential over time, the toxicant release from the acrylate-tin polymer has the advantage of being linear. Release from the TBTO and TBTF in salt water is in the order of 10–25 ppm. The organ-tins are more toxic than the copper oxide and are also difficult to form. They are used in amounts between 0.5 and 12% in coating formulations.

The ideal antifoulant should have a broad spectrum of activity, long duration and low toxicity. It is an objective of this invention to provide a new, safe and effective antifouling additive for marine coatings by using lanthanide elements or lanthanide element derivatives. These and other objects are met by the present invention and are further described in the specifications.

Lanthanide derivatives are used in glass, ceramic, paint, platics, and rubber manufacture. Compositions comprising cerium compounds are known to have bacteriocidal effects, e.g., compositions comprising cerium nitrate and silver sulfadiazine (Boechx, et al., *Burns* vol. 11, no. 5 (1985) pp. 337–342; Monafo, *3rd International Congress on Pharmacological Treatment of Burns*, Milan, Italy, May 12–15 1980, *Panmainerva Med.*, vol. 25, no. 3 (1983) pp. 151–154, Bowser, et al., *J. Trauma*, vol. 21, no. 7 (1981) pp. 558–563; Monafo, et al., *Arch. Surg*, vol. 113, no. 4 (1981) pp. 397–401; Monafo, et al., *Surgery* (St. Louis) vol. 80, no. 4 (1976) pp. 465–473), and compositions containing electrically activated silver and cerium stearate (Colmano, et al., *23rd Annual Meeting of the Biophysical Society* (New York), Atlanta Ga., Feb. 26–28, 1979, *Biophys. J.* vol. 25, no. 2, part 2 (1979) p. 217A). Cerium derivatives are also used as additives in plastics for food packaging.

The above mentioned use of lanthanides in paint pertain more particularly to cerium octoate and naphthenate that are used in small quantities to facilitate drying. These water insoluble cerium derivatives act as polymerization catalysts.

SUMMARY OF THE PRESENT INVENTION

It is an object of the present invention to provide a composition containing wood matrices or wood derived matrices cross-linked with one or more members of the group consisting of lanthanide elements and lanthanide element derivatives.

Another object of the present invention is to provide an antifouling paint comprising an additive containing wood matrices or wood derived matrices cross-linked with one or more members of the group consisting of lanthanide elements and lanthanide element derivatives.

Another object of the present invention is to provide a method for controlling or preventing growth of marine organisms by employing antifouling marine paint.

U.S. Pat. No. 4,743,473 (U.S. Ser. No. 017,159) describes a new safe method for treating wood with compositions comprising water soluble lanthanide derivatives. The discovery that wood fibers linked to lanthanide elements such as cerium, praseodymium, lanthanum, etc. are resistant to attack by fungi, molds and insects is difficult to explain. Permanent bonding of a lanthanide element or lanthanide element derivative to wood fibers appears to make them unattractive for colonization by destructive bacteria.

The present invention is an antifouling agent comprising one or more members of the group consisting of lanthanide elements and lanthanide element derivatives linked to a wood matrix or wood-derived matrix in a manner similar to the one linking lanthanides to wood fibers (vide supra). The wood matrix would be various physical forms of wood such as wood fibers, wood particles (e.g., sawdust), wood slivers, wood chips or the like. The wood derived matrix would be substances chemically derived from wood such as wood pulp, refined wood pulp, lignin derivatives, wood rosin, rosin cellulose, modified rosin, rosin gum salts, rosin derivatives or combinations thereof.

Lanthanide derivatives include lanthanide elements in all chemically stable oxidation states (O, II, III, IV) bonded to inorganic, organic or organometallic functionalities known to bond to the elements in those oxidation states. Representative but non-limiting examples include lanthanide diazadienes, halides, oxides, nitrates, sulfides, acetates, carboxylates, cyclopentadienadies, allyls, aryls, and aralkyls.

DETAILED DESCRIPTION OF THE INVENTION

In one embodiment, wood fibers cross-linked with one or more members of the group consisting of lanthanide elements and lanthanide element derivatives finely divided and dispersed in a suitable coating composition are used as an effective antifouling additive that supplies the matrix and active agent as one component.

In yet another embodiment, a lanthanide element derivative is reacted with rosin or modified rosin to form a lanthanide element, or lanthanide element derivative—rosin derivative or complex that is then added to the paint. Rosin is derived from wood and contains active sites suited for reacting/complexing with lanthanide ions. Rosin and rosin derivatives such as alcohols and esters are common ingredients in most paints and coating products, not only marine paints. Lanthanide derivative-treated rosin can be used in non-soluble as well as soluble paint matrixes. A lanthanide element derivative can also be reacted with lignin or lignin derivatives to yield a lanthanide element or lanthanide element derivative-ligin derivative or complex and used as described above. The lanthanides will impart resistance to organism attack and resulting decay.

It should be understood that the embodiment of this invention is not restricted to the use of single lanthanide derivatives in the reaction with wood matrices or wood-derived matrices. Mixtures of lanthanide derivatives (see Example 6) can also be used.

The lanthanide derivatives described in this invention may be used as aqueous solutions (e.g. lanthanide chlorides, nitrates and other water soluble lanthanide derivatives used singly or in combination), organic solutions (e.g. lanthanide carboxylates, acetates and other organic soluble lanthanide derivatives used singly or in combination) or as suspensions in aqueous or organic solvents or solvent systems (e.g. lanthanide oxides suspended in petroleum spirits used singly or in combination).

Matrices derived from wood appropriately treated with lanthanide derivatives as described in U.S. Pat. No. 4,743,473 and our co-pending applications U.S. Ser. Nos. 07/121,623 and 07/121,616 can constitute anywhere from about 5 to 100% of the paint. The amount of lanthanide element linked to the matrix can be from about 0.5% to about 40% expressed as lanthanide oxide.

The following are illustrative but non-limiting examples of the present invention.

EXAMPLE 1

Finely divided wood fibers are added to an aqueous lanthanide derivative solution at room temperature and pressure and allowed to maintain contact for several hours. Excessive solution is drained and the resulting product allowed to air-dry and age. After aging, the product is suitable for use as an antifoulant additive to paints.

EXAMPLE 2

Finely divided wood fibers are added to an aqueous lanthanide derivative solution at room temperature and elevated pressure, and allowed to maintain contact for several hours. Excessive solution is drained and the resulting product allowed to air-dry. The product is suitable for use as an antifoulant additive to paints.

EXAMPLE 3

The antifoulant prepared according to Example 1 is dispersed in a conventional marine paint formula to provide excellent antifouling properties.

EXAMPLE 4

The antifoulant prepared according to Example 2 is dispersed in a conventional marine paint formula to provide excellent antifouling properties.

Examples 5–9 below explicitly describe the synthesis of lanthanide element or lanthanide element derivative-based compositions according to the embodiment of the invention which are suitable for use as anti-fouling additives in marine paint compositions.

EXAMPLE 5

Rosin gum 44 g (corresponding to 0.13 mole) was converted first to its Na salt in water by reaction with 50% Na-hydroxide. To the resulting Na-salt solution 0.043 mole of $Pr(NO_3)_3$ (23% in water) was added, the solid precipitate filtered, washed and dried. The resulting Pr-rosinate was found to contain 11.18% of Pr. Similarly, reactions were carried out using $Nd(NO_3)_3$ and $Ce(NO_3)_3$. The expected Nd and Ce rosinates were obtained in quantitative yields.

EXAMPLE 6

An amount of 17.60 g rosin gum (0.0525 mole) was converted into its Na-salt by reaction with an equimolar amount of NaOH and then reacted with a 3x molar amount of $Nd(NO_3)_3$ and $La(NO_3)_3$, 24.5 and 23.5% aqueous solutions. The corresponding Nd and La rosinates after drying were found to contain the expected amount of the lanthanide element.

EXAMPLE 7

Wood pulp (2.5 g) was treated in an autoclave with 100 g of an aqueous solution of 3% $Ce(NO_3)_3$ for 2 hours maintaining 100 psi hydrostatic pressure. After filtering, washing and drying it was found that the pulp contained about 2.5% of cerium metal.

EXAMPLE 8

Two grams of wood pulp was kept under vacuum (28 mmHg) for about 2 hours then drowned with a 3% solution of cerium naphthenate in petroleum spirits. After 1 hour the pulp was filtered and washed with petroleum spirits. The material containing 0.4% of cerium metal is usuable in marine paints.

Similarly, a 3% colloidal dispersion of $CeO_2$ in petroleum spirits disclosed in our U.S. Pat. Nos. 4,489,000 and 4,647,401 was used to treat wood pulp. After identical work-up the sample was found to contain 0.77% cerium.

EXAMPLE 9

Refined grade wood pulp (1 g) was stirred with a 50 ml aqueous solution containing 1 g of ceriium ammonium nitrate. After filtering, washing and drying it was determined that 4.96% of cerium metal was permanently bonded to the cellulosic fibers.

What is claimed is:

1. An antifoulant additive composition comprising a matrix selected from the group consisting of finely divided wood fibers, or wood pulp, lignin, lignin derivatives, wood rosin, modified rosin, and combinations thereof, in combination with one or more numbers of the group consisting of lanthanide elements and lanthanide element derivatives bonded to said matrix.

2. The composition of claim 1, wherein said matrix selected from the grop consisting of is wood pulp, lignin, lignin derivatives wood rosin, modified rosin, and combinations thereof.

3. The composition of claim 2, wherein said matrix is finely divided wood fibers.

4. The composition of claim 2, wherein said matrix is wood rosin.

5. A method of making the composition of claim 1, comprising treating said matrix with said group consisting of one or more of said lanthanide element derivatives as an aqueous solution, an organic solution, a suspension of said one or more of said lanthanide element derivatives in an aqueous medium, or a suspension of said one or more of said lanthanide element derivatives in an organic medium.

6. The method of claim 5, wherein said matrix is treated with one or more of said lanthanide element derivatives as an aqueous solution.

7. The method of claim 5, wherein said matrix is treated with one or more of said lanthanide element derivatives as an organic solution.

8. The method of claim 5, wherein said matrix is treated with a suspension of one or more of said lanthanide element derivatives in an aqueous medium.

9. The method of claim 5, wherein said matrix is treated with a suspension of one or more of said lanthanide element derivatives in an organic medium.

10. The method of claim 5, wherein one or more of said lanthanide element derivatives is one or more lanthanide nitrates and said matrix is treated with said one or more of said lanthanide nitrates in an aqueous medium.

11. A paint composition comprising an additive of said composition of claim 1.

12. A method for controlling or preventing growth of marine organisms on the surface of a paint coating comprising mixing an additive comprising the composition of claim 1 to marine paint and applying said marine paint to an object to form said surface.

13. A paint composition of claim 11, wherein said additive has the composition of claim 2.

14. A paint composition of claim 11, wherein said additive has the composition of claim 3.

15. A paint composition of claim 11, wherein said additive has the composition of claim 4.

16. A method of claim 12, wherein said additive has the composition of claim 2.

17. A method of claim 12, wherein said additive has the composition of claim 3.

18. A method of claim 12, wherein said additive has the composition of claim 4.

19. The composition of claim 2, wherein the wood pulp is refined wood pulp.

20. The composition of claim 2, wherein the modified rosin is selected from the group consisting of resin cellulose, rosin and gum salts.

* * * * *